US012789770B2

(12) United States Patent
Hattori

(10) Patent No.: US 12,789,770 B2
(45) Date of Patent: Nov. 10, 2026

(54) VEHICLE CONTROL DEVICE

(71) Applicant: ADVICS CO., LTD., Kariya (JP)

(72) Inventor: Takenao Hattori, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 18/701,682

(22) PCT Filed: Jul. 29, 2022

(86) PCT No.: PCT/JP2022/029375
§ 371 (c)(1),
(2) Date: Apr. 16, 2024

(87) PCT Pub. No.: WO2023/074073
PCT Pub. Date: May 4, 2023

(65) Prior Publication Data

US 2024/0416877 A1 Dec. 19, 2024

(30) Foreign Application Priority Data

Oct. 29, 2021 (JP) ................................ 2021-177816

(51) Int. Cl.
*B60T 8/174* (2006.01)
*B60T 8/171* (2006.01)

(52) U.S. Cl.
CPC .............. *B60T 8/174* (2013.01); *B60T 8/171* (2013.01); *B60T 2250/00* (2013.01)

(58) Field of Classification Search
CPC ...... B60T 8/174; B60T 8/171; B60T 2250/00; B60W 30/182; B60W 40/02; B60W 50/14;
(Continued)

(56) References Cited

U.S. PATENT DOCUMENTS 9,566,986 B1 * 2/2017 Gordon .................... G05D 1/81
2019/0360446 A1 * 11/2019 Chae .................... G05D 1/0088
(Continued)

FOREIGN PATENT DOCUMENTS

JP 2009-292383 A 12/2009
JP 2019104331 A 6/2019
(Continued)

OTHER PUBLICATIONS

International Search Report (PCT/ISA/210) with English translation and Written Opinion (PCT/ISA/237) mailed on Oct. 18, 2022, by the Japanese Patent Office as the International Searching Authority for International Application No. PCT/JP2022/029375, 7 pages.
(Continued)

*Primary Examiner* — Sizo B Vilakazi
(74) *Attorney, Agent, or Firm* — BUCHANAN INGERSOLL & ROONEY PC

(57) ABSTRACT

A braking control device includes an information acquisition unit that acquires vehicle condition information related to at least one of an external condition of a vehicle and an internal condition of the vehicle, and a mode acquisition unit that acquires, from among the plurality of control modes, a control mode according to an index output from a learner by inputting the vehicle condition information acquired by the information acquisition unit to the learner that has been subjected to machine learning for estimating the control mode suitable for the vehicle condition information.

10 Claims, 7 Drawing Sheets

(58) Field of Classification Search
CPC ............ G06N 3/02; G06N 20/00; G08G 1/00; G16Y 10/40; G16Y 40/30
See application file for complete search history.

(56) References Cited

U.S. PATENT DOCUMENTS

| | | | | |
|---|---|---|---|---|
| 2020/0122724 | A1* | 4/2020 | Hiramatsu | B60W 30/181 |
| 2021/0188289 | A1* | 6/2021 | Oba | G08G 1/16 |
| 2022/0009524 | A1* | 1/2022 | Oba | B60W 50/14 |

FOREIGN PATENT DOCUMENTS

| | | | |
|---|---|---|---|
| JP | 2019-159930 | A | 9/2019 |
| JP | 2020-086801 | A | 6/2020 |
| JP | 2021-084502 | A | 6/2021 |
| WO | 2018163288 | A1 | 9/2018 |
| WO | 2020054458 | A1 | 3/2020 |

OTHER PUBLICATIONS

Office Action (Notice of Reasons for Refusal) issued on Oct. 28, 2025, in corresponding Japanese Patent Application No. 2021-177816 and English translation of the Office Action. (8 pages).

* cited by examiner

VEHICLE CONTROL DEVICE

TECHNICAL FIELD

The present invention relates to a vehicle control device.

BACKGROUND ART

Patent Literature 1 discloses that in a vehicle capable of switching between manual driving and automatic driving, a braking distance in a case where a preceding vehicle is not present during the manual driving is learned, and a learning result is reflected in a traveling characteristic of the automatic driving.

CITATIONS LIST

Patent Literature

Patent Literature 1: WO 2018/163288 A

SUMMARY OF INVENTION

Technical Problems

However, since there are a wide variety of conditions outside the vehicle (hereinafter referred to as "vehicle exterior conditions") and inside the vehicle (hereinafter referred to as "vehicle interior conditions"), there is room for improvement in order to perform vehicle control according to these conditions. An object of the present invention is to provide a vehicle control device capable of setting a suitable control mode to a vehicle according to a wide variety of vehicle exterior conditions and vehicle interior conditions.

Solutions to Problems

A vehicle control device for solving the above problem is applied to a vehicle having a plurality of control modes, and includes: an information acquisition unit that acquires vehicle condition information related to at least one of an external condition of the vehicle and an internal condition of the vehicle; and a mode acquisition unit that acquires, from among the plurality of control modes, a control mode according to an index output from a learner by inputting the vehicle condition information acquired by the information acquisition unit to the learner that has been subjected to machine learning for estimating the control mode suitable for the vehicle condition information.

In the above configuration, a relationship between the vehicle condition information and the control mode suitable for the vehicle condition information is generated by the machine learning, and the relationship is implemented in the learner. Therefore, it is possible to easily generate the preferable relationship as compared with the case where the relationship is described on a rule basis. As a result, a preferable control mode can be set for the vehicle according to a wide variety of vehicle exterior conditions and vehicle interior conditions.

DESCRIPTION OF EMBODIMENTS

First Embodiment

Hereinafter, a first embodiment of a vehicle control device will be described with reference to FIGS. 1 to 5.

Figure 1:
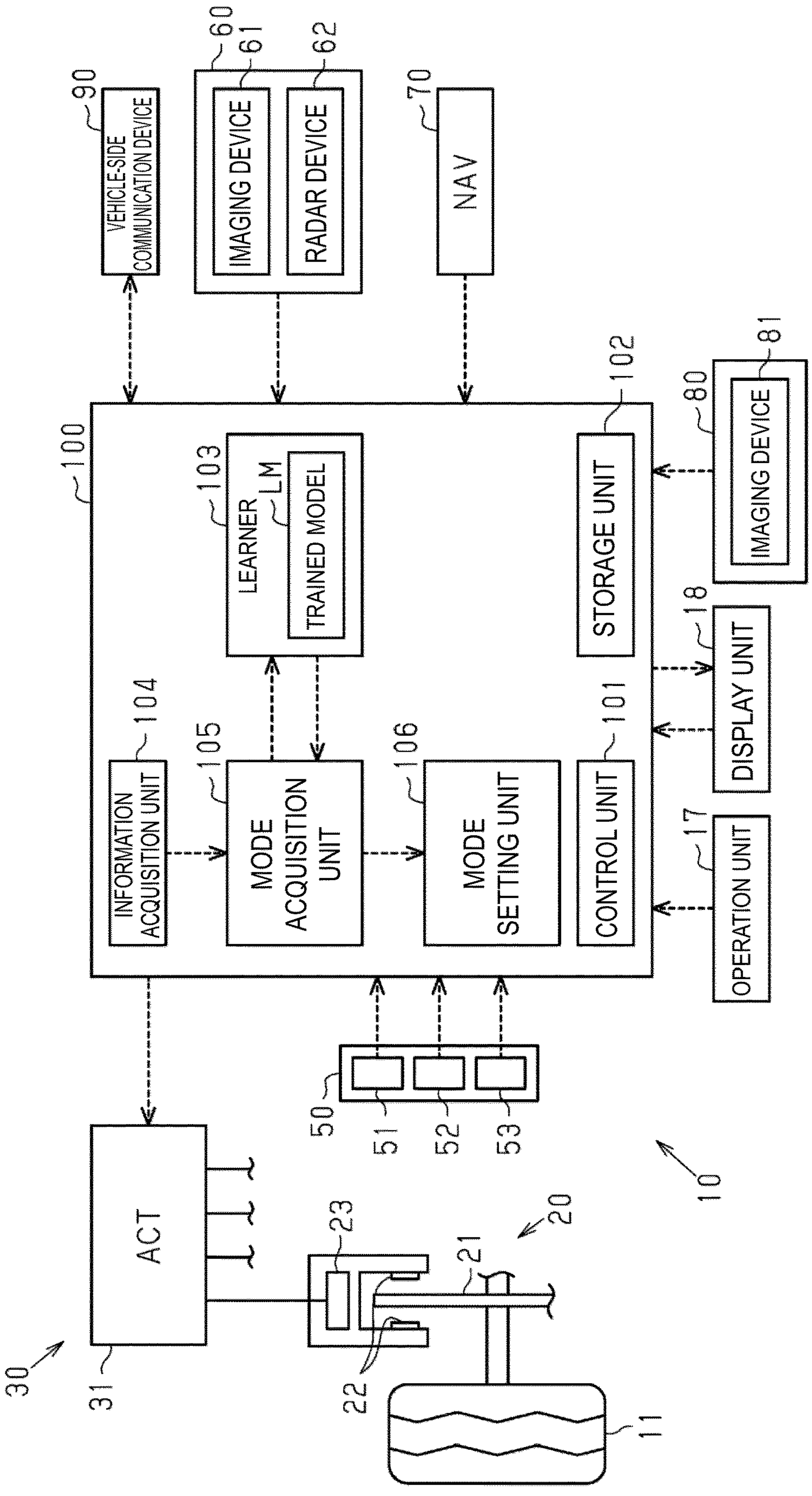
FIG. 1 is a schematic diagram illustrating a schematic configuration of a vehicle according to a first embodiment.

FIG. 1 is a schematic diagram illustrating a schematic configuration of a vehicle 10 according to the present embodiment. The vehicle 10 includes a braking control device 100 and a braking device 30. In the vehicle 10, a braking force applied to a wheel 11 by the braking device 30 is adjusted by the braking control device 100. In the present embodiment, the braking control device 100 corresponds to a "vehicle control device".

<Braking Device>

The braking device 30 includes an actuator 31 and a wheel brake 20.

The actuator 31 drives the wheel brake 20. For example, in a case where the braking device 30 is a hydraulic braking device, the actuator 31 feeds and discharges fluid to and from the wheel brake 20. In a case where the braking device 30 is an electric braking device, the actuator 31 transmits a driving force by an electric motor to the wheel brake 20.

The wheel brake 20 illustrated in FIG. 1 is a hydraulic disc brake. The wheel brake 20 includes a portion 21 subjected to friction that rotates integrally with the wheel 11, a friction portion 22, and a wheel cylinder 23. In this case, when the actuator 31 feeds and discharges fluid to and from the wheel cylinder 23, the friction portion 22 is separated from the portion 21 subjected to friction, or the friction portion 22 approaches the portion 21 subjected to friction. Then, when the friction portion 22 comes into contact with the portion 21 subjected to friction, a frictional braking force is generated on the wheel 11.

<Sensor System, Vehicle Exterior Monitoring System, Navigation Device, Vehicle Interior Monitoring System>

A sensor system 50, a vehicle exterior monitoring system 60, a navigation device 70, and a vehicle interior monitoring system 80 are connected to the braking control device 100.

The sensor system 50 detects a traveling state of the vehicle 10. For example, the sensor system 50 includes a wheel speed sensor 51, a longitudinal acceleration sensor 52, and a yaw rate sensor 53. In this case, the sensor system 50 detects a wheel speed WS, a longitudinal acceleration Gx, and a yaw rate Yr, and outputs information corresponding thereto (hereinafter referred to as "sensor information") to the braking control device 100.

The vehicle exterior monitoring system 60 monitors a vehicle exterior condition. For example, the vehicle exterior monitoring system 60 includes an imaging device 61 and a radar device 62. The imaging device 61 images the outside of the vehicle 10. The radar device 62 detects a distance and a direction between the vehicle 10 and another vehicle, or an obstacle located around the vehicle 10. In this case, the vehicle exterior monitoring system 60 outputs information based on an image captured by the imaging device 61 (hereinafter referred to as "vehicle exterior imaging information") and information based on a distance and a direction detected by the radar device 62 (hereinafter referred to as "radar information") to the braking control device 100.

The vehicle exterior imaging information may be an image captured by the imaging device 61 or an image obtained by performing image processing on the image captured by the imaging device. The radar information may be a distance or a direction detected by the radar device 62, or may be three-dimensional space information generated from the distance or the direction.

The navigation device 70 acquires the current position and acquires information regarding the current position (hereinafter referred to as "map information"). The map information includes information regarding at least one of geography, topography, roads, facilities, and stores around the current position of the vehicle 10. The navigation device 70 may be an in-vehicle navigation device provided in the vehicle 10 or a mobile communication device owned by an occupant of the vehicle 10.

Hereinafter, information indicating the vehicle exterior condition such as vehicle exterior imaging information, radar information, and map information is referred to as "vehicle exterior condition information".

The vehicle interior monitoring system 80 monitors the interior of the vehicle 10. For example, the vehicle interior monitoring system 80 includes an imaging device 81 that images the inside of the vehicle 10. In this case, the vehicle interior monitoring system 80 outputs information regarding an image captured by the imaging device 81 (hereinafter referred to as "vehicle interior imaging information") to the braking control device 100.

<Operation Unit and Display Unit>

An operation unit 17 and a display unit 18 are connected to the braking control device 100.

The operation unit 17 receives an operation of changing a control mode of the vehicle 10 by an occupant (mainly a driver) of the vehicle 10. The operation unit 17 outputs operation contents by the occupant of the vehicle 10 to the braking control device 100. The control mode will be described later in detail.

The display unit 18 displays information output from the braking control device 100. For example, the display unit 18 displays characters and icon images indicating the control mode.

<Control Mode>

The vehicle 10 has a plurality of control modes. In the present embodiment, the present invention will be described by exemplifying a control mode related to braking control of the vehicle 10, but the control mode may be related to driving control, may be related to steering control, or may be related to at least two types of cooperative control of braking, driving, and steering of the vehicle 10. Furthermore, in the present embodiment, the present invention will be described by exemplifying four control modes of the first control mode to the fourth control mode, but two or three control modes may be prepared, or five or more control modes may be prepared.

The first control mode is a standard braking control mode.

The second control mode is a braking control mode that emphasizes the comfort of the occupant of the vehicle 10.

For example, in the second control mode, it is conceivable to suppress the pitching motion and the roll motion of the vehicle 10 at the time of braking as compared with the first control mode. In this case, as the braking control in the second control mode, known pitching suppression control or roll suppression control can be used.

The third control mode is a braking control mode in which environmental performance for the travel environment of the vehicle 10 is emphasized.

For example, when a braking force is generated by the wheel brake 20, dust is generated by wear of the friction portion 22. Here, a generation amount of dust increases as a force of pressing the friction portion 22 against the portion 21 subjected to friction increases and the time of pressing the friction portion 22 against the portion 21 subjected to friction increases. Therefore, in the third control mode, it is conceivable to suppress the braking force by the wheel brake 20 or shorten the braking time by the wheel brake 20 as compared with the first control mode. In this case, as the braking control in the third control mode, control of suppressing the friction braking force and compensating for the suppression of the friction braking force with a non-friction braking force is conceivable. As the non-friction braking force, a mechanical braking force or a regenerative braking force can be used.

Furthermore, in the third control mode, the sound generated at the time of braking is reduced as compared with the first control mode. In this case, a known brake squeal suppression control can be used as the third control mode.

The fourth control mode is a braking mode in which safety of an occupant of the vehicle 10 is emphasized.

For example, in the fourth control mode, it is conceivable to increase the responsiveness of the braking activation of the wheel brake 20 as compared with the first control mode. In this case, as the braking control in the fourth control mode, a known responsiveness improvement control can be used.

Furthermore, in the fourth control mode, it is conceivable to suppress the occurrence of slip in the vehicle 10 as compared with the first control mode. In this case, as the braking control in the fourth control mode, it is conceivable to use control in which a start threshold of the known anti-lock brake control or a start threshold of the traction control is set to a side where the control is more likely to be intervened than in the first control mode.

Furthermore, in the fourth control mode, it is conceivable to increase the stability of the posture of the vehicle 10 as compared with the first control mode. In this case, as the braking control in the fourth control mode, it is conceivable to use control in which a start threshold of the known vehicle stability control is set to a side where the control is more likely to be intervened than in the first control mode.

<Braking Control Device>

The braking control device 100 includes a control unit 101, a storage unit 102, and a learner 103. The storage unit 102 stores various control programs executed by the control unit 101.

The learner 103 is constructed by a trained model LM that has been subjected to machine learning for estimating a control mode suitable for the vehicle exterior condition and the vehicle interior condition. When the vehicle exterior condition information and the vehicle interior condition information are input, the trained model LM outputs a probability value according to these pieces of information. The probability value is output for each control mode. The probability value corresponds to an "index". For example, the trained model LM is a forward propagation neural network. A learning method of the trained model LM will be described later.

Hereinafter, the vehicle exterior condition and the vehicle interior condition are referred to as "vehicle condition". Furthermore, the vehicle exterior condition information and the vehicle interior condition information are referred to as "vehicle condition information".

Here, the vehicle condition relates to performance that should be emphasized in traveling of the vehicle 10, and thus to a control mode suitable for the vehicle condition.

For example, according to the vehicle exterior imaging information and the radar information, it is possible to grasp the number of vehicles, pedestrians, and obstacles located around the vehicle 10 and distances thereto. According to the vehicle exterior imaging information and the map information, it is possible to grasp the type of a region and the type of a road where the vehicle 10 is traveling. According to the map information, it is possible to grasp a facility or a store existing around the vehicle 10 and a topography of a region or a shape of a road where the vehicle 10 is traveling. Hereinafter, a vehicle, a pedestrian, or an obstacle located around the vehicle 10 is referred to as "surrounding vehicles or the like".

It is considered that, as the number of surrounding vehicles or the like of the vehicle 10 increases, a distance between the vehicle 10 and the surrounding vehicles or the like decreases, and as the vehicle 10 approaches a traffic light or an intersection, safety tends to be emphasized. In a case where the vehicle 10 is traveling in an urban area or a residential area, safety tends to be emphasized more than a case where the vehicle 10 is traveling in a commercial area or an industrial area. In a case where the vehicle 10 is traveling on a general road, it is considered that safety tends to be emphasized more than a case where the vehicle 10 is traveling on an expressway. It is considered that as there are more facilities and stores where children gather, such as schools, around the vehicle 10, a tendency to emphasize safety increases.

In a case where the vehicle 10 is traveling in the country or on an expressway, it is considered that comfort tends to be emphasized more than a case where the vehicle 10 is traveling in an urban area or on a general road. In a case where the vehicle 10 is traveling on a main road, it is considered that the tendency to emphasize the environment is higher than a case where the vehicle is traveling on a community road.

According to the vehicle interior imaging information, it is possible to grasp the number, age, posture, and the like of occupants of the vehicle 10.

It is considered that the older the driver of the vehicle 10 is, the larger the number of people who get on the vehicle 10 is, the higher the tendency to emphasize safety. In a case where an elderly person or a child gets on the vehicle 10, it is considered that safety tends to be emphasized. In a case where the posture of the occupant other than the driver of the vehicle 10 is a relaxed posture leaning against the seat, it is considered that comfort tends to be emphasized.

It is considered that a conformity degree of each control mode to the vehicle condition is determined by comprehensively considering the tendency of the performance emphasized in the vehicle 10.

The braking control device 100 functions as an information acquisition unit 104, a mode acquisition unit 105, and a mode setting unit 106 when the control unit 101 executes a control program.

The information acquisition unit 104 acquires vehicle condition information. For example, the information acquisition unit 104 acquires vehicle exterior imaging information, radar information, and map information as vehicle exterior condition information. Furthermore, the information acquisition unit 104 acquires vehicle interior imaging information as vehicle interior condition information.

The mode acquisition unit 105 acquires a control mode suitable for the vehicle condition information acquired by the information acquisition unit 104. Specifically, the mode acquisition unit 105 inputs the vehicle condition information to the learner 103, and acquires a control mode suitable for the vehicle condition information from the four control modes on the basis of the probability value output from the learner 103.

For example, the mode acquisition unit 105 selects the control mode having the highest probability value. Here, it is conceivable that the probability value of the control mode not included in the vehicle 10 becomes the highest depending on the trained model LM of the learner 103. In this case, the mode acquisition unit 105 may acquire the control mode having the highest probability value among the four control modes.

Hereinafter, a control mode suitable for the vehicle condition acquired as described above is referred to as a "recommended control mode".

The mode setting unit 106 changes or maintains the control mode of the vehicle 10 on the basis of the recommended control mode.

For example, in a case where the change of the control mode of the vehicle 10 to the recommended control mode is to degrade safety by placing importance on comfort and environmental properties of the vehicle 10, the mode setting unit 106 proposes the change of the control mode to the occupant of the vehicle 10. The processing related to the proposal may display the proposal content on the display unit 18 or may convert the proposal content into audio. In this case, the mode setting unit 106 changes the control mode of the vehicle 10 to the recommended control mode on condition that an intention to accept the proposal by the occupant of the vehicle 10 is received. The intention of the occupant may be an operation by the occupant received by the operation unit 17 or a voice of the occupant.

On the other hand, in a case where the change of the control mode of the vehicle 10 to the recommended control mode is to enhance the safety of the vehicle 10, the mode setting unit 106 changes the control mode of the vehicle 10 to the recommended control mode without confirming the intention of the occupant of the vehicle 10. In this case, the mode setting unit 106 may notify the occupant of the vehicle 10 that the control mode of the vehicle 10 has been changed to the recommended control mode. The processing related to this notification may display the change content of the control mode on the display unit 18 or may convert the change content of the control mode of the vehicle 10 into audio.

Note that the mode setting unit 106 maintains the current control mode in a case where the recommended control mode is the same as the current control mode of the vehicle 10.

<Control Mode Change Processing>

Figure 2:
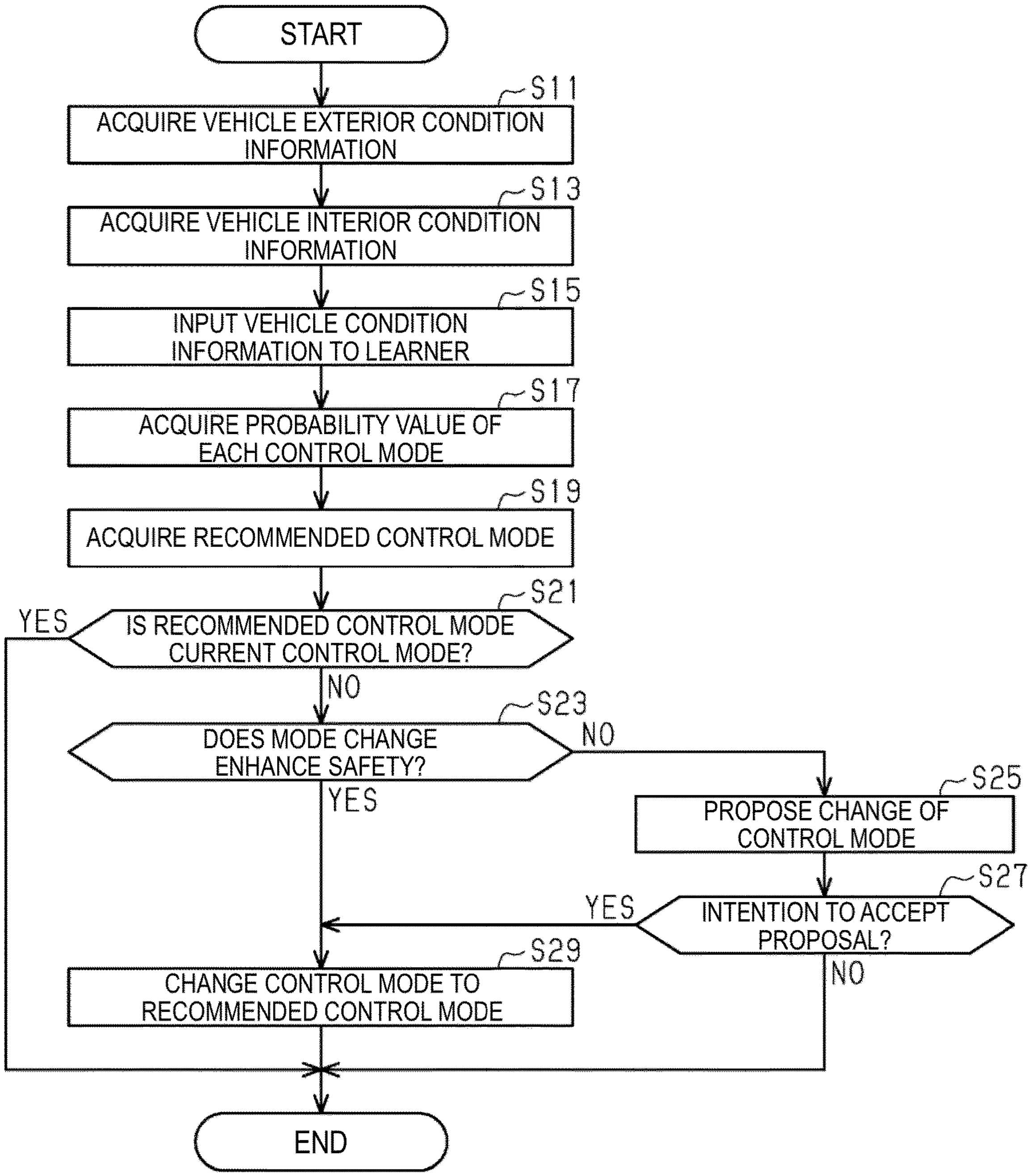
FIG. 2 is a flowchart illustrating a flow of control mode change processing executed in the vehicle according to the first embodiment.

FIG. 2 is a flowchart illustrating a flow of processing of changing a control mode on the basis of a vehicle condition. Hereinafter, this processing is referred to as "control mode change processing". A control program corresponding to the control mode change processing is executed by the control unit 101 every predetermined control cycle.

In the braking control device 100, the information acquisition unit 104 acquires vehicle exterior condition information in step S11, and acquires vehicle interior condition information in step S13.

In step S15, the braking control device 100 inputs the vehicle condition information acquired in steps S11 and S13 to the learner 103 by the mode acquisition unit 105.

In step S17, the braking control device 100 acquires, by the mode acquisition unit 105, a probability value corresponding to each control mode output from the learner 103.

In step S19, the braking control device 100 acquires, by the mode acquisition unit 105, a recommended control mode on the basis of the probability value acquired in step S17.

In step S21, the braking control device 100 determines whether or not the recommended control mode acquired in step S19 is the same as the current control mode of the vehicle 10 by the mode setting unit 106. In the case of determining that the recommended control mode is the same as the current control mode (S21: YES), the braking control device 100 ends the processing of this time, and in the case of determining that the recommended control mode is not the same as the current control mode (S21: NO), the braking control device proceeds to the processing of step S23.

In step S23, the braking control device 100 determines whether or not the change of the current control mode of the vehicle 10 to the recommended control mode enhances safety by the mode setting unit 106, that is, whether or not the recommended control mode is the fourth control mode. In the case of determining that the change enhances safety (S23: YES), the braking control device 100 proceeds to the processing of step S29, and in the case of determining that the change does not enhance safety (S23: NO), the braking control device proceeds to the processing of step S25.

In step S25, the braking control device 100 proposes changing the control mode of the vehicle 10 to the recommended control mode to the occupant of the vehicle 10 by the mode setting unit 106.

In step S27, the braking control device 100 determines whether or not an intention (hereinafter referred to as "intention to accept proposal") of the occupant of the vehicle 10 who accepts the content proposed in step S25 (hereinafter referred to as "proposal content") has been acquired by the mode setting unit 106. In a case where it is determined that the intention to accept the proposal has been acquired (S27: YES), the braking control device 100 proceeds to the processing of step S29, and in a case where it is determined that the intention to accept the proposal has not been acquired (S27: NO), the braking control device ends the processing of this time. The braking control device 100 may wait for a predetermined time until the intention to accept the proposal is acquired.

In step S29, the braking control device 100 changes the control mode of the vehicle 10 to the recommended control mode by the mode setting unit 106, and ends the processing of this time.

<Learning System>

Next, a learning system and a learning method for generating the trained model LM will be described with reference to FIGS. 3 and 4.

Figure 3:
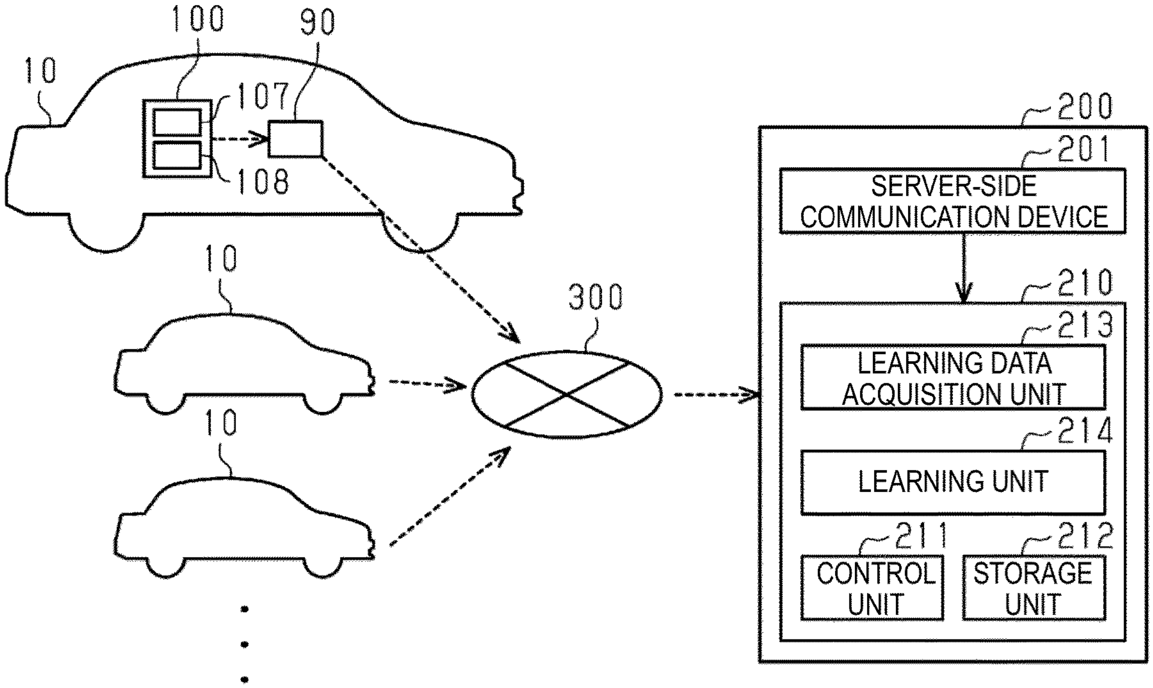
FIG. 3 is a schematic diagram illustrating a schematic configuration of a learning system according to the first embodiment.

FIG. 3 is a schematic diagram illustrating a schematic configuration of a learning system of the present embodiment. The learning system includes a vehicle 10 and a server device 200. A plurality of the vehicles 10 are connected to the server device 200 via a mobile communication network 300. In the learning system, learning data LD is generated in the plurality of vehicles 10, and machine learning is performed using the learning data LD in the server device 200. This learning result is the trained model LM.

<Vehicle>

Each of the vehicles 10 includes a vehicle-side communication device 90.

The vehicle-side communication device 90 transmits information output from the braking control device 100 to the server device 200 via the mobile communication network 300.

The braking control device 100 functions as a learning data generation unit 107 and a learning data transmission unit 108 when the control unit 101 executes a control program.

The learning data generation unit 107 acquires the vehicle condition information and the control mode of the vehicle 10 at the same time, and generates the learning data LD by associating them. The learning data generation unit 107 may generate the learning data LD by associating the vehicle condition information when the control mode is changed by the occupant of the vehicle 10 with the changed control mode, or may acquire the vehicle condition information and the control mode at a predetermined cycle and generate the learning data LD by associating them.

The learning data transmission unit 108 transmits the learning data LD generated by the learning data generation unit 107 to the server device 200 via the vehicle-side communication device 90.

<Server Device>

The server device 200 includes a server-side communication device 201 and a learning device 210. In the server device 200, the server-side communication device 201 receives the learning data LD transmitted from the vehicle 10, and the learning device 210 performs machine learning using the learning data LD.

The learning device 210 includes a control unit 211 and a storage unit 212. The storage unit 212 stores a learning program and a learning model, and stores learning data LD and a learning result LR. The initial value of the learning result LR may be given by a template of a learning model or may be given by an input of an operator. In a case where relearning is performed, the initial value of the learning result LR may be given on the basis of the learning result LR.

Hereinafter, the learning model will be specifically described as a neural network, but the learning model of the present invention is not limited to the neural network. In a case where the learning model is a neural network, the learning result LR is a weight of a connection between neurons and a threshold of each neuron.

The control unit 211 executes the learning program, whereby the learning device 210 functions as a learning data acquisition unit 213 and a learning unit 214.

The learning data acquisition unit 213 acquires the learning data LD received by the server-side communication device 201.

The learning unit 214 performs machine learning for estimating a control mode suitable for the vehicle condition using the learning data LD acquired by the learning data acquisition unit 213, and stores a learning result LR in the storage unit 212. Specifically, the learning unit 214 inputs the vehicle condition of the learning data LD to the learning model, updates parameters of the learning model so that the output of the learning model indicates the control mode of the learning data LD, and stores the updated parameters in the storage unit 212 as the learning result LR.

For example, the learning unit 214 inputs the vehicle condition information of the learning data LD to an input layer of the neural network, and calculates an error between an output value of an output layer of the neural network and a correct value. For example, as the correct value, a value corresponding to a control mode of the learning data LD is set to 1, and a value corresponding to another control mode is set to 0.

The learning unit 214 updates the weight of the connection between the neurons and the threshold value of each neuron so as to reduce these errors. At this time, the learning unit 214 can use a well-known back propagation through time method, a stochastic gradient descent method, or the like. Then, the learning unit 214 stores the updated weight and threshold value in the storage unit 212.

<Learning Data Generation Processing>

Figure 4:
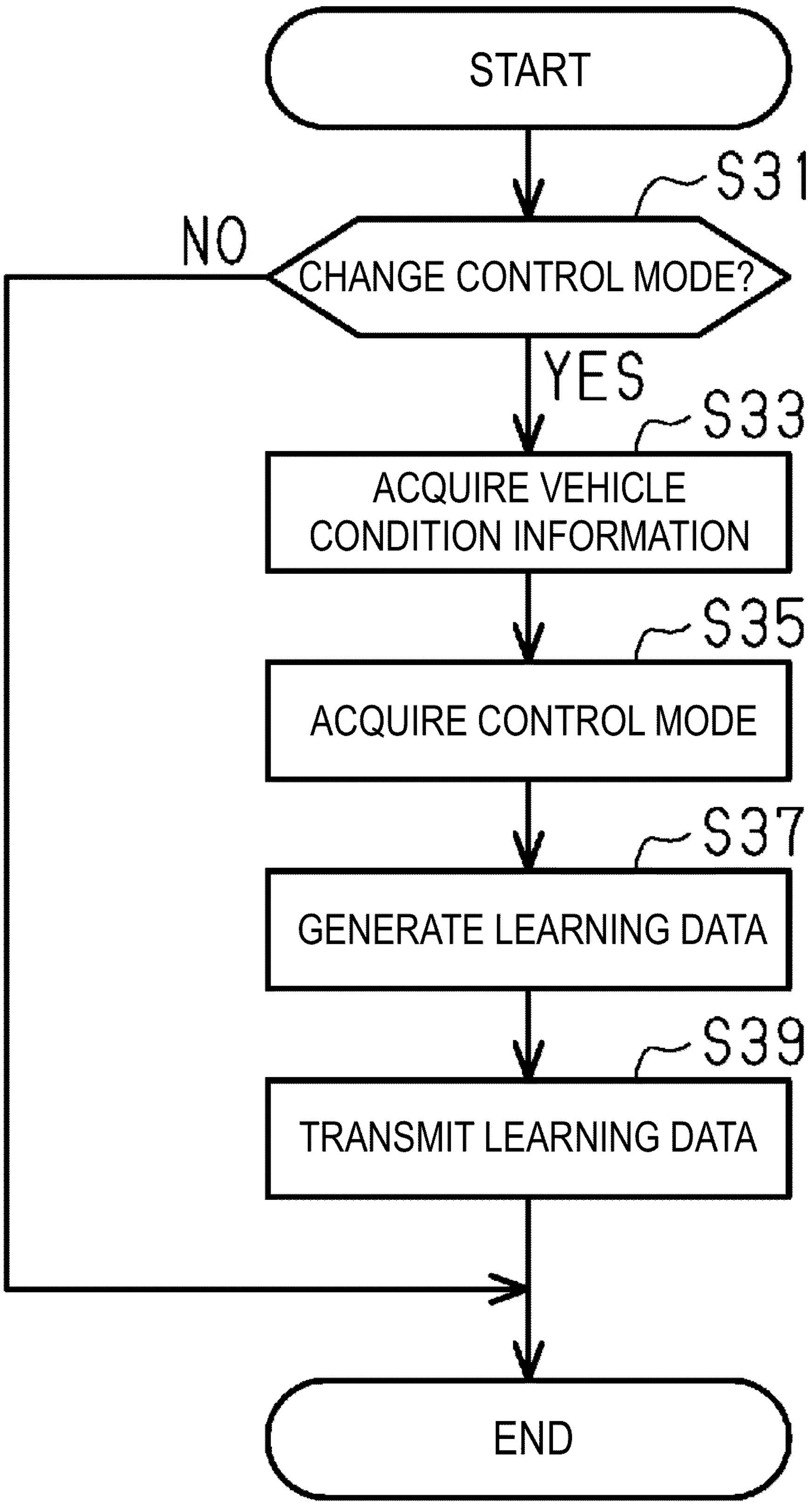
FIG. 4 is a flowchart illustrating a flow of learning data generation processing executed in the vehicle according to the first embodiment.

FIG. 4 is a flowchart illustrating a flow of processing of generating the learning data LD in the vehicle 10. Hereinafter, this processing is referred to as "learning data generation processing". A control program corresponding to the learning data generation processing is executed by the control unit 101 every predetermined control cycle.

In step S31, the braking control device 100 determines whether or not the control mode has been changed by an occupant of the vehicle 10. In the case of determining that the control mode has been changed by the occupant of the vehicle 10 (step S31: YES), the braking control device 100 proceeds to the processing of step S33, and in the case of determining that the control mode has not been changed by the occupant of the vehicle 10 (step S31: NO), the braking control device ends the processing of this time.

In step S33, the braking control device 100 acquires vehicle condition information by the information acquisition unit 104.

In step S35, the braking control device 100 acquires a control mode of the vehicle 10.

In step S37, the braking control device 100 causes the learning data generation unit 107 to generate the learning data LD by associating the vehicle condition information acquired in step S33 with the control mode acquired in step S35.

In step S39, the braking control device 100 transmits the learning data LD generated in step S37 to the server device 200 by the learning data transmission unit 108.

<Learning Processing>

Figure 5:
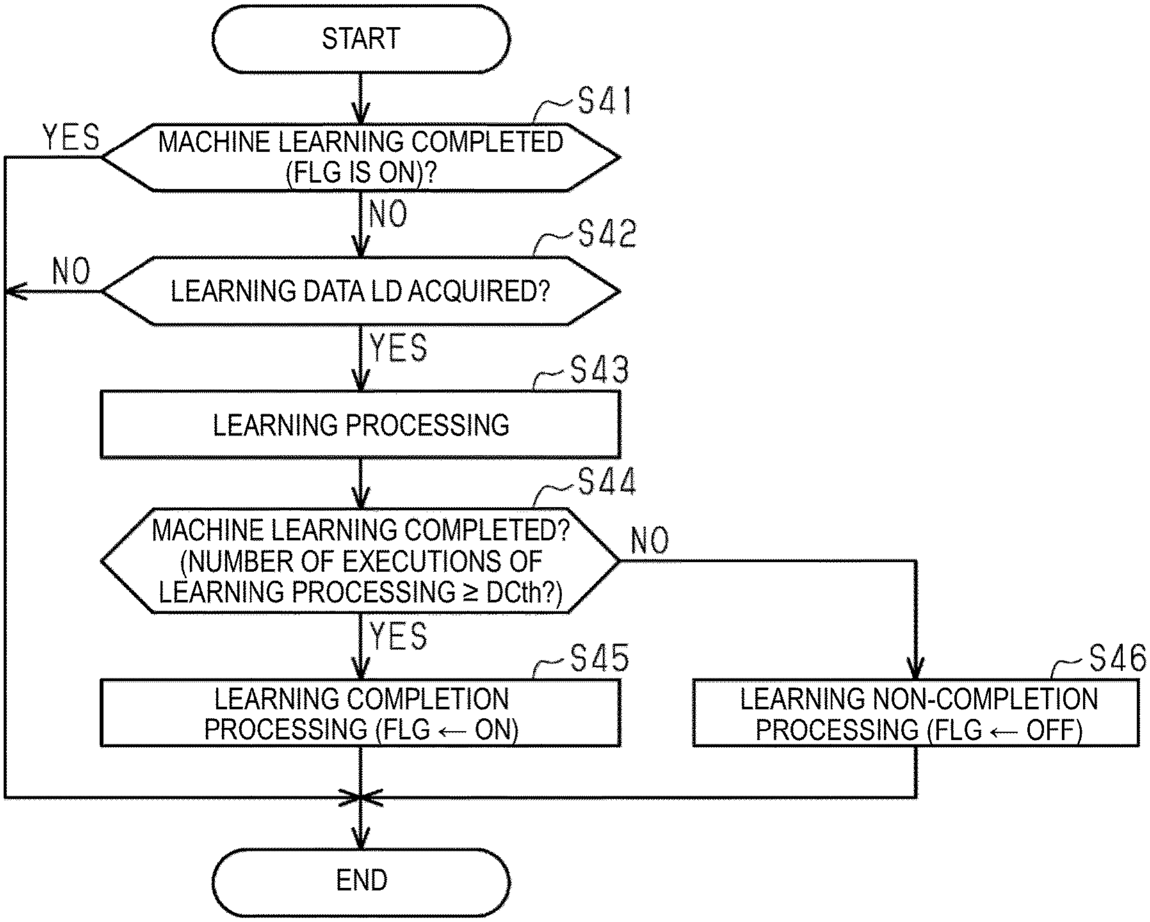
FIG. 5 is a flowchart illustrating a flow of learning processing executed by a server device according to the first embodiment.

FIG. 5 is a flowchart illustrating a flow of machine learning in the server device 200. Hereinafter, this processing is referred to as "learning processing". A control program corresponding to the learning processing is executed by the control unit 211 every predetermined control cycle.

In step S41, the learning device 210 determines whether or not the machine learning is completed. For example, the learning device 210 determines whether or not a flag FLG indicates the completion of the machine learning. In a case where the flag FLG is ON indicating the completion of the machine learning (S41: YES), the learning device 210 ends the processing of this time, and in a case where the flag FLG is OFF indicating the non-completion of the machine learning (S41: NO), the learning device proceeds to the processing of step S42.

In step S42, the learning device 210 determines whether or not the learning data LD is acquired by the learning data acquisition unit 213. In a case where it is determined that the learning data LD has not been acquired (S42: NO), the learning device 210 ends the processing of this time, and in a case where it is determined that the learning data LD has been acquired (S42: YES), the learning device proceeds to the processing of step S43.

In step S43, the learning device 210 causes the learning unit 214 to perform machine learning for estimating a control mode suitable for the vehicle condition using the learning data LD acquired in step S42, and stores the learning result LR in the storage unit 212.

In step S44, the learning device 210 determines whether or not the machine learning has been completed. For example, the learning device 210 counts the number of executions of the processing of step S43, determines that the machine learning has been completed in a case where the number of executions is greater than or equal to a set value DCth, and determines that the machine learning has not been completed in a case where the number of executions is less than the set value DCth.

In the case of determining that the machine learning is completed (S44: YES), the learning device 210 proceeds to the processing of step S45, and in the case of determining that the machine learning is not completed (S44: NO), the learning device proceeds to the processing of step S46.

In step S45, the learning device 210 turns on the flag FLG indicating the completion of the machine learning, and ends the processing of this time.

In step S46, the learning device 210 turns off the flag FLG indicating the non-completion of the machine learning, and ends the processing of this time.

Effects of Present Embodiment (1-1) In the present embodiment, the function of estimating the control mode suitable for the vehicle condition is realized as the trained model LM by machine learning. According to the trained model LM, it is possible to accurately estimate a suitable control mode according to a vehicle condition in various modes as compared with an algorithm in which a function corresponding to the trained model LM is described on a rule basis. As a result, a suitable control mode can be set for the vehicle 10 according to a wide variety of vehicle conditions.

(1-2) In the present embodiment, the learning data LD is generated in the vehicle 10, and the learning data LD is transmitted to the server device 200. Then, in the present embodiment, the server device 200 performs machine learning using the learning data LD received from the vehicle 10.

According to the present embodiment, a learning system can be configured including the vehicle 10 as a general vehicle. In this case, the learning data LD can be generated not in the traveling of a dedicated vehicle for the specific purpose but in the traveling of a general vehicle in the market, and the learning data LD can be collected in the server device 200. That is, the cost for preparing the learning data LD and the cost required for generating the trained model LM can be reduced. Here, the specific purpose is to collect the learning data LD, and the dedicated vehicle is a vehicle equipped with a device developed for the purpose of collecting the learning data LD.

(1-3) In the present embodiment, the vehicle condition and the control mode of the vehicle 10 are simultaneously acquired, and the learning data LD is generated by associating the vehicle condition and the control mode with each other.

As a result, the learning data LD having a high correlation between the vehicle condition and the control mode can be generated, and the efficiency of the machine learning can be increased. Furthermore, the estimation accuracy of the control mode by the trained model LM can be improved, and eventually, the accuracy of the control mode change control in the vehicle 10 can be improved.

In particular, by generating the learning data LD by associating the vehicle condition when the control mode is changed by the occupant of the vehicle 10 with the changed control mode, the learning data LD having higher correlation between the vehicle condition and the control mode can be generated.

Furthermore, many pieces of learning data LD can be reliably generated by acquiring the vehicle condition information and the control mode at a predetermined cycle and generating the learning data LD by associating the vehicle condition information and the control mode with each other.

(1-4) In the present embodiment, the learning data LD is generated with the vehicle exterior imaging information as the vehicle exterior condition information and the vehicle interior imaging information as the vehicle interior condition information. Here, according to an image, a wide variety of vehicle conditions can be accurately indicated as compared with characters and numerical values. Therefore, by using the vehicle exterior imaging information and the vehicle interior imaging information as inputs to the learning model, it is possible to perform machine learning for estimating a control mode suitable for various types of vehicle conditions. Furthermore, it is possible to set a suitable control mode according to a wide variety of vehicle conditions in the vehicle 10.

(1-5) In the present embodiment, the learning data LD is generated using the map information as the vehicle exterior condition information. Here, the map information includes a wide range of information that is not included in a range that can be imaged by the imaging device. Therefore, by using the map information as an input to the learning model, machine learning for estimating a control mode suitable for a wide range of vehicle exterior conditions can be performed. Furthermore, a suitable control mode can be set for the vehicle 10 according to a wide range of vehicle exterior conditions.

Second Embodiment

Hereinafter, an embodiment of a vehicle control system will be described with reference to FIGS. 6 and 7. In the present embodiment, portions different from those of the first embodiment will be mainly described, and substantially the same configurations and functions as those of the first embodiment will be denoted by the same reference signs, and redundant description will be omitted.

Figure 6:
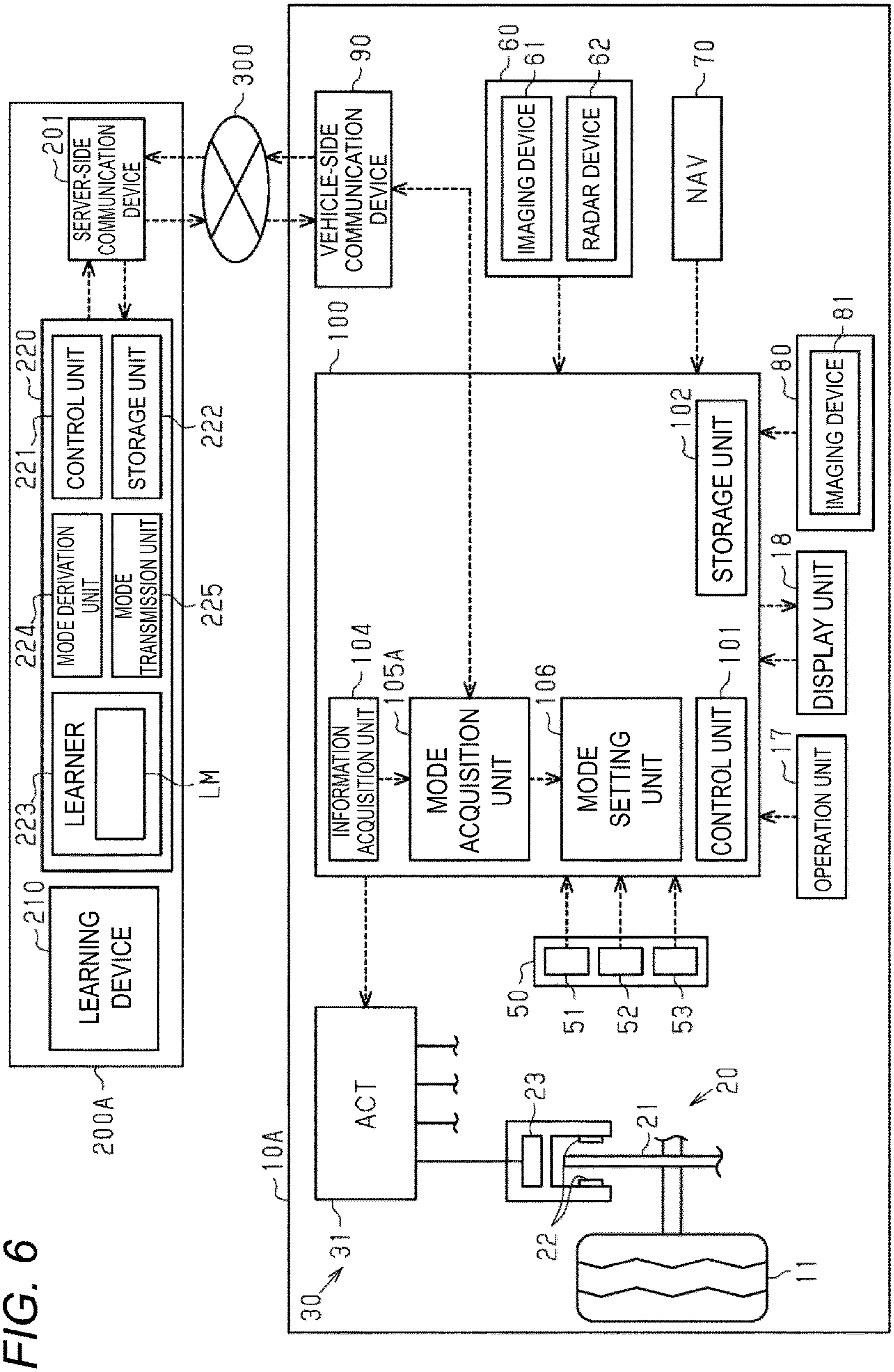
FIG. 6 is a schematic diagram illustrating a schematic configuration of a vehicle control system of a second embodiment.

FIG. 6 is a schematic diagram illustrating a schematic configuration of a vehicle control system according to the present embodiment. The vehicle control system includes a vehicle 10A and a server device 200A. A plurality of the vehicles 10A are connected to the server device 200A via a mobile communication network 300.

<Vehicle>

Each of the vehicles 10A of the present embodiment is substantially the same as the vehicle 10 of the first embodiment except that a control program stored in a storage unit 102 is different from that of the vehicle 10 of the first embodiment. A braking control device 100 of the vehicle 10A functions as an information acquisition unit 104, a mode acquisition unit 105A, and a mode setting unit 106 when a control unit 101 executes the control program.

The mode acquisition unit 105A transmits vehicle condition information acquired by the information acquisition unit 104 to the server device 200A, and acquires a control mode (recommended control mode) suitable for the transmitted vehicle condition information from the server device 200A. Specifically, the mode acquisition unit 105A transmits the vehicle condition information to the server device 200A via a vehicle-side communication device 90. Then, the mode acquisition unit 105A receives the recommended control mode transmitted from the server device 200A via the vehicle-side communication device 90.

<Server Device>

The server device 200A of the present embodiment is substantially the same as the server device 200 of the first embodiment except that a mode providing device 220 is provided.

The mode providing device 220 includes a control unit 221, a storage unit 222, and a learner 223. The storage unit 222 stores a control program executed by the control unit 221. The learner 223 is substantially the same as the learner 103 of the first embodiment.

The mode providing device 220 functions as a mode derivation unit 224 and a mode transmission unit 225 when the control unit 221 executes the control program.

The mode derivation unit 224 derives a recommended control mode on the basis of the vehicle condition information received via a server-side communication device 201. For example, the mode derivation unit 224 inputs the vehicle condition information to the learner 223, and derives a control mode suitable for the vehicle condition information from the four control modes as the recommended control mode on the basis of a probability value output from the learner 223.

The mode transmission unit 225 transmits the recommended control mode derived by the mode derivation unit 224 to the vehicle 10A via the server-side communication device 201.

<Control Mode Change Processing>

Figure 7:
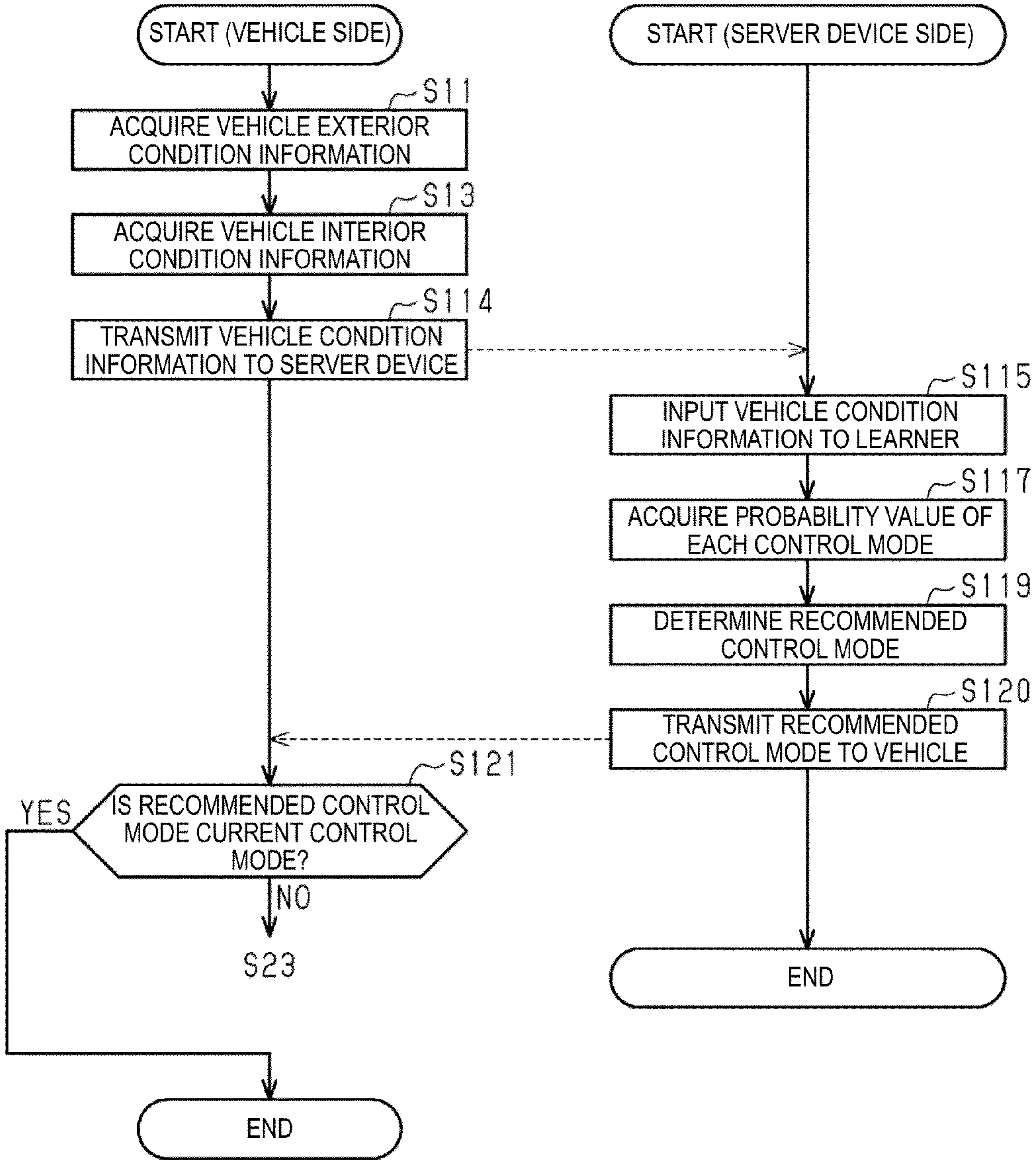
FIG. 7 is a sequence diagram illustrating a flow of control mode change processing executed by the vehicle control system according to the second embodiment.

FIG. 7 is a sequence diagram illustrating a flow of control mode change processing in the vehicle control system of the present embodiment.

The processing of steps S11 and S13 in the vehicle 10A is substantially the same as the processing of steps S11 and S13 of the first embodiment illustrated in FIG. 2, respectively.

In step S114, the braking control device 100 transmits the vehicle condition information acquired in steps S11 and S13 to the server device 200A via the vehicle-side communication device 90 by the mode acquisition unit 105A.

In the server device 200A, when the vehicle condition information transmitted from the vehicle 10A is received, the mode providing device 220 executes the processing of steps S115 to S120.

The processing of steps S115 to S119 is substantially the same as the processing of steps S15 to S19 of the first embodiment illustrated in FIG. 2, respectively, except that the execution subject of these processing is the mode providing device 220 and that the input to the learner 223 in the processing of step S115 is the vehicle condition information transmitted from the vehicle 10A.

The mode providing device 220 inputs the vehicle condition information received by the server-side communication device 201 in step S115 to the learner 223 by the mode derivation unit 224, acquires a probability value corresponding to each control mode output from the learner 223 in step S117, and derives a recommended control mode on the basis of the probability value corresponding to each control mode in step S119.

In step S120, the mode providing device 220 transmits the recommended control mode derived in step S119 to the vehicle 10A via the server-side communication device 201.

In the vehicle 10A, when the recommended control mode transmitted from the server device 200A is received, the braking control device 100 proceeds to the processing of step S121.

The processing of step S121 is substantially the same as the processing of step S21 of the first embodiment illustrated in FIG. 2 except that the processing target is the recommended control mode transmitted from the server device 200A.

In step S121, the braking control device 100 determines whether or not the recommended control mode transmitted from the server device 200A is the same as the current control mode of the vehicle 10A by the mode setting unit 106. In the case of determining that the recommended control mode is the same as the current control mode (S121; YES), the braking control device 100 ends the processing of this time, and in the case of determining that the recommended control mode is not the same as the current control mode (S121: NO), the braking control device proceeds to the processing of step S23.

Since the processing of step S23 and subsequent steps is substantially the same as the processing of steps S23 to S29 of the first embodiment illustrated in FIG. 2, illustration and description thereof in FIG. 7 are omitted.

Effects of Present Embodiment

According to the present embodiment, in addition to the effects equivalent to the above (1-1) to (1-5), the following effects can be further obtained.

(2-1) In the present embodiment, the server device 200A provides the vehicle 10A with the recommended control mode. As a result, since it is not necessary to provide a configuration corresponding to the learner 103 of the first embodiment in the vehicle 10A, the vehicle 10A can be simplified.

(2-2) In the present embodiment, the learner 223 is provided in the server device 200A. As a result, the processing of updating the trained model LM can be simplified. Furthermore, the control mode of the vehicle 10A can be set on the basis of the latest trained model LM.

Modification Examples

The plurality of embodiments can be modified as follows. The plurality of embodiments and the following modification examples can be implemented in combination with each other within a range not technically contradictory.

In the plurality of embodiments described above, the control mode suitable for the vehicle exterior condition and the vehicle interior condition is set as the recommended control mode.

However, a control mode suitable for any one of the vehicle exterior condition and the vehicle interior condition may be set as the recommended control mode.

Furthermore, a control mode suitable for the vehicle condition and the traveling state of the vehicle may be set as the recommended control mode. In this case, for example, the vehicle condition, the sensor information, and the control mode may be simultaneously acquired, the vehicle condition, the sensor information, and the control mode may be associated with each other to generate learning data, and a trained model may be generated by machine learning using the learning data. Then, the vehicle condition and the sensor information may be input to the trained model, and the recommended control mode may be acquired based on a probability value output from the trained model.

In the plurality of embodiments described above, the control mode suitable for the vehicle condition is acquired from the four control modes on the basis of the probability value output from the learner. However, a control mode not suitable for the vehicle condition (hereinafter referred to as a "non-recommended control mode") may be acquired. In this case, for example, it is conceivable to acquire the control mode having the lowest probability output from the trained model as the non-recommended control mode. In this case, in a case where an occupant of the vehicle performs an operation to change the control mode of the vehicle to the non-recommended control mode, it is conceivable to give a warning to the change of the control mode or record the change of the control mode.

In the plurality of embodiments, in a case where the change of the control mode of the vehicle to the recommended control mode lowers the safety, the intention of the occupant of the vehicle is confirmed, that is, the change is proposed to the occupant of the vehicle. However, even if the change of the control mode of the vehicle to the recommended control mode lowers the safety, the control mode of the vehicle may be changed to the recommended control mode without confirming the intention of the occupant of the vehicle, that is, without proposing the change to the occupant of the vehicle.

In the plurality of embodiments described above, in a case where the change of the control mode of the vehicle to the recommended control mode enhances safety, the control mode of the vehicle is changed to the recommended control mode without confirming the intention of the occupant of the vehicle, that is, without proposing the change to the occupant of the vehicle. However, even if the change of the control mode of the vehicle to the recommended control mode enhances safety, the intention of the occupant of the vehicle may be confirmed, that is, the change may be proposed to the occupant of the vehicle.

In the plurality of embodiments described above, the presence or absence of confirmation of the intention of the occupant of the vehicle is determined from the viewpoint of safety. However, the presence or absence of confirmation of the intention of the occupant of the vehicle may be determined from the viewpoint other than safety, for example, from the viewpoint of comfort and environment.

In the plurality of embodiments described above, the vehicle exterior imaging information, the radar information, and the map information are exemplified as the vehicle exterior condition information. However, the vehicle exterior condition information is not limited to these pieces of information, and may be any information as long as it indicates the vehicle exterior condition. For example, the vehicle exterior condition information may be information obtained by road-to-vehicle communication or vehicle-to-vehicle communication.

In the above-described plurality of embodiments, the vehicle interior imaging information has been exemplified as the vehicle interior condition information. However, the vehicle interior condition information is not limited to the vehicle interior imaging information, and may be any information as long as it indicates the vehicle interior condition. For example, the vehicle interior condition information may be information obtained from a seat sensor, a load sensor, or the like, information obtained from a mobile communication device carried by an occupant of the vehicle, or information input by the occupant of the vehicle.

In the plurality of embodiments described above, the learning data LD is collected from the plurality of general vehicles via the mobile communication network 300. However, the learning data LD may be acquired by traveling of the dedicated vehicle for a specific purpose. In this case, the dedicated vehicle may not be connected to the server device via the mobile communication network 300. In this case, it is conceivable to store in a storage device the learning data LD or the vehicle condition information and the control mode acquired at the same time in the dedicated vehicle and connect the storage device to the learning device 210.

In the first embodiment, the learner 103 is provided in the braking control device 100 of the vehicle 10. However, the learner 103 may be provided in a control device other than the control device related to the braking control of the vehicle. Examples of the control device other than the control device related to the braking control of the vehicle include a control device related to the driving control of the vehicle, a control device related to the steering control of the vehicle, and a control device related to at least two types of cooperative control of braking, driving, and steering of the vehicle.

In the plurality of embodiments described above, the learner is provided separately from the storage unit, but the trained model LM may be stored in the storage unit.

The braking control device 100 is not limited to a device that includes a CPU and a ROM and executes software processing. For example, a dedicated hardware circuit that performs hardware processing on at least a part of those subjected to software processing in the plurality of embodiments may be provided. Examples of the dedicated hardware circuit include an ASIC.

Next, a technical idea that can be grasped from the plurality of embodiments and modification examples will be described.

(a) It is preferable that the learner has been subjected to machine learning on the basis of the vehicle condition information acquired by a plurality of the vehicles.

(b) The plurality of control modes preferably include at least one of a control mode that affects safety of an occupant of the vehicle, a control mode that affects comfort of the occupant of the vehicle, and a control mode that affects a travel environment of the vehicle.

(c) Preferably, the mode acquisition unit acquires the control mode suitable for the vehicle condition information as a recommended control mode, and the proposal unit does not propose a change of the control mode of the vehicle to the recommended control mode to an occupant of the vehicle in a case where the change enhances safety of the vehicle.

(d) Preferably, the mode acquisition unit acquires the control mode suitable for the vehicle condition information as a recommended control mode, and the proposal unit proposes a change of the control mode of the vehicle to the recommended control mode to an occupant of the vehicle in a case where the change degrades safety of the vehicle.

(e) Preferably, the mode acquisition unit includes a warning unit that warns an occupant of the vehicle that the control mode not suitable for the vehicle condition information is acquired as a non-recommended control mode and that the control mode of the vehicle is changed to the non-recommended control mode.

(f) In a vehicle control system of a vehicle having a plurality of control modes, the vehicle control system including a server device and a vehicle connected to the server device via a mobile communication network, preferably, the vehicle includes an information acquisition unit that acquires vehicle condition information related to at least one of an external condition of the vehicle and an internal condition of the vehicle, and an information transmission unit that transmits the vehicle condition information acquired by the information acquisition unit to the server, and the server device includes a mode acquisition unit that acquires, from among the plurality of control modes, a control mode according to an index output from a learner by inputting the vehicle condition information transmitted from the vehicle to the learner that has been subjected to machine learning to output the control mode suitable for the vehicle condition information, and a mode transmission unit that transmits the control mode acquired by the mode acquisition unit to the vehicle.

In this control system, the vehicle preferably includes a mode setting unit that sets a control mode of the vehicle based on the control mode received from the server device.

(g) In a learning system related to control of a vehicle having a plurality of control modes, the learning system including a server device and a vehicle connected to the server device via a mobile communication network, preferably, the vehicle includes a learning data generation unit that simultaneously acquires vehicle condition information related to at least one of an external condition of the vehicle and an internal condition of the vehicle, and a control mode of the vehicle, and generates learning data by associating the vehicle condition information with the control mode, and a learning data transmission unit that transmits the learning data generated by the learning data generation unit to the server device, and the server device includes a learning unit that performs machine learning for outputting the control mode suitable for the vehicle condition information using the learning data transmitted from the vehicle.

In this case, the learning data generation unit preferably generates learning data by associating the vehicle condition information when an occupant of the vehicle changes the control mode with the control mode after the control mode is changed.

Furthermore, preferably, the learning data generation unit generates the learning data by associating the vehicle condition information acquired at a predetermined cycle with the control mode.

(h) A learning method related to control of a vehicle preferably includes: an information acquisition step of simultaneously acquiring vehicle condition information related to at least one of an external condition of the vehicle and an internal condition of the vehicle, and a control mode of the vehicle; a learning data generation step of generating learning data by associating the vehicle condition information acquired in the information acquisition step with the control mode; and a learning step of performing machine learning of outputting the control mode suitable for the vehicle condition information by using the learning data generated in the learning data generation step.

(i) A learning method to be applied to a learning system related to control of a vehicle having a plurality of control modes, the learning system including a server device and a vehicle connected to the server device via a mobile communication network, the learning method preferably includes: an information acquisition step of simultaneously acquiring, in the vehicle, vehicle condition information related to at least one of an external condition of the vehicle and an internal condition of the vehicle, and a control mode of the vehicle; a learning data generation step of generating, in the vehicle, learning data by associating the vehicle condition information acquired in the information acquisition step with the control mode; and a learning data transmission step of transmitting, in the vehicle, the learning data generated in the learning data generation step to the server device.

The learning method preferably includes a learning step of performing, in a server device, machine learning for outputting the control mode suitable for the vehicle condition information using the learning data received from the vehicle.

The invention claimed is:

1. A vehicle control device applied to a vehicle having a plurality of control modes, the vehicle control device comprising:

an information acquisition unit that acquires vehicle condition information related to at least one of an external condition of the vehicle and an internal condition of the vehicle; and a mode acquisition unit that acquires, from among the plurality of control modes, a control mode according to an index output from a learner by inputting the vehicle condition information acquired by the information acquisition unit to the learner that has been subjected to machine learning for estimating the control mode suitable for the vehicle condition information.

2. The vehicle control device according to claim 1, wherein the learner has been subjected to machine learning based on the vehicle condition information when the control mode is changed by an occupant of the vehicle and the changed control mode is performed.

3. The vehicle control device according to claim 2, further comprising a mode setting unit that sets the control mode acquired by the mode acquisition unit to the control mode of the vehicle.

4. The vehicle control device according to claim 2, further comprising a proposal unit that proposes setting of the control mode of the vehicle to the control mode acquired by the mode acquisition unit to an occupant of the vehicle.

5. The vehicle control device according to claim 1, further comprising a mode setting unit that sets the control mode acquired by the mode acquisition unit to the control mode of the vehicle.

6. The vehicle control device according to claim 1, further comprising a proposal unit that proposes setting of the control mode of the vehicle to the control mode acquired by the mode acquisition unit to an occupant of the vehicle.

7. The vehicle control device according to claim 1, wherein the vehicle condition information is any of an image of the external condition of the vehicle and an image of the internal condition of the vehicle.

8. The vehicle control device according to claim 1, wherein the plurality of control modes include a standard braking mode, and at least one of a braking control mode in which comfort of an occupant of the vehicle is emphasized, a braking control mode in which environmental performance for the travel environment of the vehicle is emphasized, and a braking control mode in which safety of an occupant of the vehicle is emphasized.

9. The vehicle control device according to claim 1, wherein the mode acquisition unit acquires a control mode suitable for at least one of the vehicle exterior condition and the vehicle interior condition on the basis of the index output from the learner.

10. The vehicle control device according to claim 1, wherein the mode acquisition unit acquires a control mode not suitable for at least one of the vehicle exterior condition and the vehicle interior condition on the basis of the index output from the learner.

* * * * *